United States Patent Office 3,437,683
Patented Apr. 8, 1969

3,437,683
CONVERSION OF TRINITROMETHYL COMPOUNDS
Donald J. Glover, Bowie, and Mortimer J. Kamlet, Silver Spring, Md., assignors to the United States of America as represented by the Secretary of the Navy
No Drawing. Continuation-in-part of application Ser. No. 236,169, Nov. 7, 1962. This application Apr. 23, 1965, Ser. No. 450,549
Int. Cl. C07c 79/04, 103/00, 79/36
U.S. Cl. 260—478                          8 Claims

ABSTRACT OF THE DISCLOSURE

A process for converting a compound containing a terminal trinitromethyl group to the metallic salt of the corresponding compound containing a terminal dinitromethyl group which consists of reacting said trinitromethyl compound with a solution of a metallic iodide in an alkanol to produce said metallic salt. These metallic salts have use as explosives per se as well as intermediates for the preparation of other explosives and propellants.

---

This application is a continuation-in-part of application Ser. No. 236,169, filed Nov. 7, 1962, now abandoned, for Conversion of Trinitromethyl Compounds.

The invention described herein may be manufactured and used by or for the Government of the United States of America for governmental purposes without the payment of any royalties thereon or therefor.

This invention generally relates to a method of preparing compounds which are explosives per se and which are useful as intermediates in the preparation of other explosive compounds and propellants. More specifically, the invention is directed to a method of converting compounds having a terminal trinitromethyl group to salts of the corresponding compounds having a terminal dinitromethyl group.

One of the main problems occurring in organic synthesis is the onset of undesirable side reactions and the subsequent difficulties encountered in obtaining a pure end product which is not contaminated by the products of such side reactions.

Accordingly, it is an object of this invention to prepare compounds having a terminal dinitromethyl group by a novel process which comprises treating the corresponding compound having a terminal trinitromethyl group with an alcoholic solution of a metallic iodide whereby undesirable side reactions are avoided and recovery of product is freed from procedures normally instituted to separate undesirable contaminants.

It is a further object of this invention to convert compounds having a terminal trinitromethyl group to salts of the corresponding compounds having terminal dinitromethyl groups.

The objects of the invention are accomplished by treating a wide variety of compounds such as alkanes, carboxylic acid esters, ketones and amides having terminal trinitromethyl groups with an alcoholic solution of a metallic iodide so as to reduce the starting material to the corresponding metal salt having a terminal dinitromethyl group. It appears, from theoretical considerations, that nearly any compound of the Formula I R—C(NO$_2$)$_3$, wherein R is an organic radical, may be converted to a compound of Formula II R—C(NO$_2$)$_2$⁻M⁺ wherein R is as defined above and M⁺ is a metal ion.

Exemplary compounds having a terminal trinitromethyl group which may be reduced by the method of this invention are alkanes such as 1,1,1 - trinitroethane, nitro substituted alkanes such as 1,1,1,3-tetranitropropane, alkyl esters of alkanoic acids such as methyl-4,4,4-trinitrobutyrate, alkyl alkyl ketones such as 5,5,5-trinitropentanone - 2, aryl alkyl ketones such as 4,4,4 - trinitrobutyrophenone, and unsubstituted amides of alkanoic acids such as 4,4,4-trinitrobutyramide. It is to be understood, however, that these compounds are merely illustrative of the wide scope of the types of compounds which may be acted upon by the process of the invention.

The metallic iodides which may be utilized in the conversion process are those metallic iodides which upon reaction with the starting material yield the corresponding dinitromethyl metal salts which are relatively insoluble in alcohol. In this way, a solid product is easily obtained. Exemplary metallic iodides which find utility in the process of the invention are the iodides of potassium, copper, calcium, cadmium, zinc, aluminum, germanium, lead and nickel. Iodides of other metals are operable but due to the higher solubility of the end products in alcohol the product must be caused to precipitate by evaporation of an alcoholic solution thereof.

The general process of this invention comprises the addition of the particular trinitromethyl compound to the metallic iodide in a lower alkanol. The mixture is then either refluxed or stirred overnight at room temperature. The resulting mixture may then be concentrated, depending on the relative solubility of the product, the salt of the dinitromethyl compound coming down as a precipitate. The salt is then filtered, washed with ether and recrystallized from methanol-water.

The following reaction scheme illustrates the apparent course of the reaction but it is to be understood that the invention is not to be bound to or limited thereby.

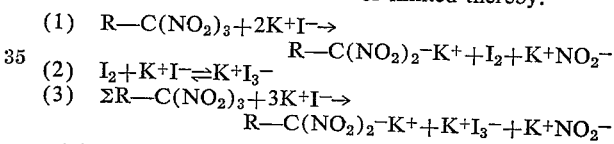

The following example illustrates a specific embodiment of the invention but it is to be understood that the scope of the invention is not to be limited thereto.

EXAMPLE

Preparation of methyl-potassium-4,4-dinitrobutyrate

Methyl - 4,4,4-trinitrobutyrate, 2.0 g. (0.0084 mole), was added to a warm solution of 8.4 g. potassium iodide in 100 ml. methanol and this solution was heated to boiling in a 300 ml. round-bottom flask fitted with a reflux condenser. Iodine formed immediately and a yellow solid began precipitating after 10 minutes. The refluxing was stopped after 1 hour, the solution was cooled to room temperature and the solid was filtered by suction. The yellow crystals were washed with methanol and then sucked dry weight 1.50 g. (77% of theoretical).

The solid was taken up in 100 ml. of hot methanol, 10 ml. water were added and solution was effected by boiling. The solution was then cooled in an ice bath and the yellow crystals which formed were filtered, washed with methanol and dried in a vacuum desiccator. The final, dry weight was 1.15 g. (60%) of methyl-potassium-4,4-dinitrobutyrate.

The salt may be converted to the analogous dinitromethyl compound by conventional treatment of the aqueous salt solution with an inorganic acid such as HCl.

By the above procedure the salts from 1,1,1,3-tetranitropropane, 4,4,4 - trinitrobutyrophenone, 5,5,5 - trinitropentanone-2, 4,4,4 - trinitrobutyramide and 1,1,1-trinitroethane were prepared. The salts prepared were potassium-1,1,3 - trinitropropane, potassium - 4,4 - dinitrobutyrophenone, potassium-5,5-dinitropentanone-2, potassium-4,4-dinitrobutyramide and potassium-1,1-dinitroethane.

Since the compounds by which the process of the invention is described are explosive in nature the appropriate coventional precautions should be taken in their handling.

The procedure may be carried out at ambient pressure and at the reflux temperature of methanol, although lower temperatures may be used. Heat is applied merely to increase the rate of reaction.

The concentrations of the reactants is critical in the sense that there must be at least 3 iodide ions present for each mole of trinitromethyl compound to be converted.

Obviously many modifications and variations of the present invention are possible in the light of the above teachings. It is therefore to be understood that, within the scope of the appended claims, the invention may be practiced otherwise then as specifically described.

Having thus described the invention, what is claimed and desired to be secured by Letters Patent of the United States is:

1. The process of converting an organic compound characterized by the presence of a terminal trinitromethyl group to the metallic salt of the corresponding compound having a terminal dinitromethyl group, said compound having a terminal trinitromethyl group being selected from the group consisting of alkanes, nitro substituted alkanes, alkyl esters of alkanoic acids, alkyl alkyl ketones, alkyl aryl ketones, and unsubstituted amides of alkanoic acids which comprises contacting said trinitromethyl compound with a solution of a metallic iodide selected from the group consisting of the iodides of potassium, copper, calcium, cadmium, zinc, aluminum, germanium, lead and nickel in a lower alkanol, said solution containing at least three iodide ions for each mole of said trinitromethyl compound and maintaining a temperature that is no higher than the reflux temperature of said solution to produce the metallic salt of said compound having a terminal dinitromethyl group.

2. The process of claim 1 wherein said metallic iodide is potassium iodide.

3. The process of claim 2 wherein said compound having a terminal trinitromethyl group is methyl-4,4,4-trinitrobutyrate.

4. The process of claim 2 wherein said compound having a terminal trinitromethyl group is 1,1,1-trinitroethane.

5. The process of claim 2 wherein said compound having a terminal trinitromethyl group is 5,5,5-trinitropentanone-2.

6. The process of claim 2 wherein said compound having a terminal trinitromethyl group is 4,4,4-trinitrobutyramide.

7. The process of claim 2 wherein said compound having a terminal trinitromethyl group is 1,1,1,3-tetranitropropane.

8. The process of claim 2 wherein said compound having a terminal trinitromethyl group is 4,4,4-trinitrobutyrophenone.

References Cited

Frankel, J. Organic Chemistry, vol. 23, pp. 813–15 (June 1958).

Glover et al., J. Organic Chemistry, vol. 26, pp. 4734–5 (November 1961).

JAMES A. PATTEN, *Primary Examiner.*

M. G. BERGER, *Assistant Examiner.*

U.S. Cl. X.R.

260—429, 429.9, 435, 438.1, 439, 448, 561, 592, 593, 644; 149—23, 24